United States Patent
Cappello et al.

(10) Patent No.: US 11,717,755 B2
(45) Date of Patent: Aug. 8, 2023

(54) CONTENT GENERATION SYSTEM AND METHOD

(71) Applicant: Sony Interactive Entertainment Inc., Tokyo (JP)

(72) Inventors: Fabio Cappello, London (GB); Maria Chiara Monti, London (GB); Matthew Sanders, Hertfordshire (GB); Timothy Bradley, London (GB); Oliver Hume, London (GB); Jason Craig Millson, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/408,684

(22) Filed: Aug. 23, 2021

(65) Prior Publication Data

US 2022/0062770 A1   Mar. 3, 2022

(30) Foreign Application Priority Data

Aug. 28, 2020 (GB) ..................... 2013531

(51) Int. Cl.
*A63F 13/63* (2014.01)
*A63F 13/215* (2014.01)
(Continued)

(52) U.S. Cl.
CPC ............ *A63F 13/63* (2014.09); *A63F 13/213* (2014.09); *A63F 13/215* (2014.09);
(Continued)

(58) Field of Classification Search
CPC ...... A63F 13/63; A63F 13/213; A63F 13/215; A63F 13/424; A63F 13/537; A63F 13/5378; A63F 13/86; A63F 13/87; G06F 40/20
See application file for complete search history.

(56) References Cited

U.S. PATENT DOCUMENTS

| | | | |
|---|---|---|---|
| 2004/0066386 A1* | 4/2004 | Leprevost | G06T 15/04 345/582 |
| 2012/0042022 A1* | 2/2012 | Sheth | H04L 51/52 709/206 |

(Continued)

FOREIGN PATENT DOCUMENTS

WO    2015131280 A1    9/2015

OTHER PUBLICATIONS

Combined Search Report and Abbreviated Examination Report for corresponding GB Application No. 2013531.5, 5 pages, dated Jan. 20, 2021.

Extended European Search Report for corresponding EP Application No. 21192114.3, 10 pages, dated Jan. 25, 2022.

(Continued)

*Primary Examiner* — Thomas J Hong
*Assistant Examiner* — Carl V Larsen
(74) *Attorney, Agent, or Firm* — Matthew B. Dernier, Esq.

(57) ABSTRACT

A content generation system, the system comprising an input obtaining unit operable to obtain one or more samples of input text and/or audio relating to a first content, an input analysis unit operable to generate n-grams representing one or more elements of the obtained inputs, a representation generating unit operable to generate a visual representation of one or more of the generated n-grams, and a display generation unit operable to generate second content comprising one or more elements of the visual representation in association with the first content.

11 Claims, 3 Drawing Sheets

(51) Int. Cl.

| | |
|---|---|
| *A63F 13/86* | (2014.01) |
| *A63F 13/213* | (2014.01) |
| *A63F 13/5372* | (2014.01) |
| *A63F 13/5378* | (2014.01) |
| *A63F 13/537* | (2014.01) |
| *A63F 13/87* | (2014.01) |
| *A63F 13/424* | (2014.01) |
| *G06F 40/20* | (2020.01) |

(52) U.S. Cl.
CPC .......... *A63F 13/424* (2014.09); *A63F 13/537* (2014.09); *A63F 13/5372* (2014.09); *A63F 13/5378* (2014.09); *A63F 13/86* (2014.09); *A63F 13/87* (2014.09); *G06F 40/20* (2020.01)

(56) References Cited

U.S. PATENT DOCUMENTS

| | | | |
|---|---|---|---|
| 2017/0003784 A1* | 1/2017 | Garg | A63F 13/87 |
| 2017/0308290 A1 | 10/2017 | Patel | |
| 2021/0220747 A1* | 7/2021 | Niwa | H04N 21/234 |
| 2022/0210098 A1* | 6/2022 | Zhang | G06F 16/313 |

OTHER PUBLICATIONS

Anonymous, "n-gram" Wikipedia, https://en.wikipedia.org/w/index.php?title=N-gram&oldid=802489359, 9 pages, dated Sep. 26, 2017.

* cited by examiner

CONTENT GENERATION SYSTEM AND METHOD

BACKGROUND OF THE INVENTION

Field of the Invention

This disclosure relates to a content generation system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years there has been a significant increase in the popularity of 'e-sports' amongst both competitors and spectators. E-sports, or electronic sports, generally include computer games that are played competitively between two or more players or teams, and these games may be streamed live to an audience via television or an online portal (such as a video streaming website). In some cases, a player of the game streams their own point of view such that spectators can have an insight into an individual player's experience, while in others a commentator may be provided to give an overview of the entire game in a manner analogous to traditional sports broadcasting.

In many cases, viewers are able to interact with one another during the game via an associated chat room or the like which enables text to be sent and received by each viewer. This can improve viewer enjoyment of the content, due to the increased engagement, as well as enable a deeper appreciation of the game through game analysis, tactical discussion, and player appreciation and the like.

In some arrangements, viewers are able to select from different viewpoints when spectating a game that is being played. For example, a viewer may be able to focus on a particular player (or player character), a particular objective, or a static/dynamic view of one or more portions of the in-game environment. In such cases, the chat feature described above may be advantageous in that it can be used to alert users to particular hotspots for action—this can lead to an improved user viewing experience, as it reduces the likelihood of them missing the action.

While video games have been discussed here, similar arrangements may be implemented in conjunction with more traditional video content—for example, a movie, a television episode, or a real-world sports game. As with the game content, these may be live (or provided with only a slight delay) or may be entirely pre-recorded. It is also considered that this may be extended to virtual recreations of real-world events (or other computer-rendered content)—for example, a computer-generated recreation of a sports match or a virtual television series.

It is in the context of the above arrangements that the presently disclosure arises.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
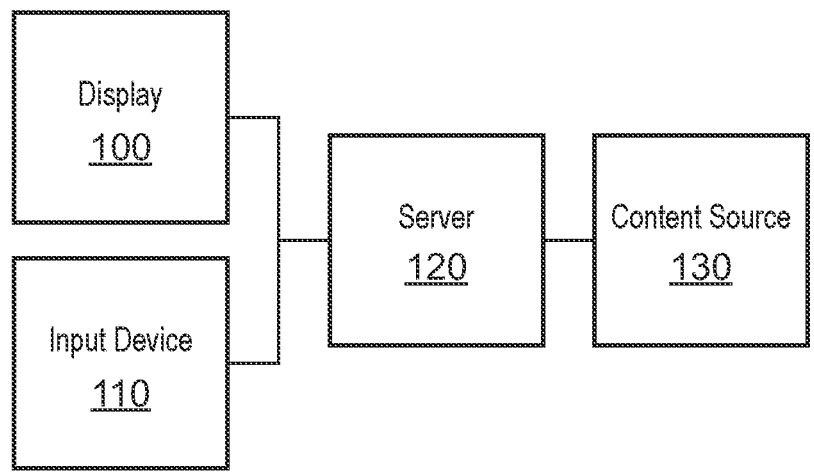
FIG. 1 schematically illustrates a content providing system.

Referring now to the drawings, wherein like reference numerals designate identical or corresponding parts throughout the several views, embodiments of the present disclosure are described.

FIG. 1 schematically illustrates a content providing system that is suitable for providing content to a viewer and enabling the viewer to provide comments or other inputs in response to the content. The content providing system comprises a display 100, an input device 110, a server 120, and a content source 130.

The configuration of the display 100 and the input device 110 may be determined freely as appropriate for a given implementation. For instance, the display 100 may be a television that displays content to the viewer and the input device 110 may be a mobile phone. A personal computer and associated display may also be an example of a suitable input device 110 and display 100. Alternatively, the input device 110 may be embodied as a games console (which may also provide the content to the display 100, rather than only being suitable for receiving inputs) with associated peripherals for enabling user input. The inputs provided to the input device 110 may comprise any suitable text input, images, or spoken content, and these inputs are transmitted to the server 120 via any suitable network connection.

The content source 130 is shown as being associated with the server 120 in FIG. 1; however this should not be regarded as being limiting. While in some embodiments the server 120 obtains content from the content source 130 (such as from a storage medium or an external broadcast) and provides the content to the viewer, other arrangements are also considered suitable. For instance, a content source may be a local storage medium (such as a hard drive or a disk), a digital broadcast obtained via a television, or a server unrelated to the server 120 which handles inputs from the viewer.

The arrangements described above are considered to be purely exemplary, and any suitable device or combination of devices that may be configured to provide content and receive inputs from a user is considered appropriate in the context of this disclosure.

As noted above, viewer inputs may be provided in the form of text inputs, images, and/or spoken words or phrases.

These inputs may be captured using any suitable input device, including keypads, microphones, cameras, motion sensors, or any other measurement device or peripheral. In particular, game controllers and/or keyboard (physical or on-screen) may be particularly suitable examples of such peripherals, with microphones being particularly suited to capturing audio inputs and a camera being operable to capture motion-based inputs (such as shortcuts to select pre-defined text).

Once the inputs are received, analysis is performed so as to interpret the inputs so as to enable the inputs to be utilised more effectively. One method for performing such an analysis is that of generating an n-gram representation of the input. While generally considered to be of particular use in the context of word-based inputs (such as text and speech), it may be extended to images where appropriate. For instance, in online environments it may be common to use images to replace words in a number of scenarios—examples of such image use include so-called 'reaction GIFs' and emojis. A number of these images may be pre-identified, to assist with the interpretation and may be used to also assign a meaning or interpretation of the images where appropriate. An example of an n-gram generation process is described below with reference to FIG. 2.

In the present context, an n-gram is a sequence of n items identified from the viewer's input; for instance, a two-item sequence (such as a two-word phrase) is regarded as a 2-gram, and a four-item sequence is regarded as a 4-gram. N-grams may be considered to be a particularly useful format when performing a natural language processing (NLP) method, and as such can be used to interpret inputs from a viewer so as to form a basis of an output generation method. In many cases n-grams based upon sequences of words are used, while in others character-level items may be used or indeed any other item size (such as three-character blocks, or entire sentences). N-grams are generally utilised as they offer an effective way of characterising content, particularly through the use of NLP, which can enable an effective word prediction to be performed.

Figure 2:
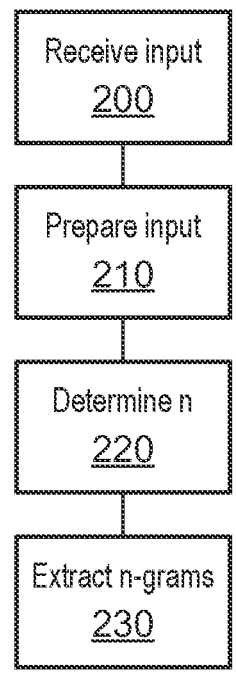
FIG. 2 schematically illustrates an n-gram extraction process.

Referring to FIG. 2, at a step 200 one or more inputs are received. As noted above, these inputs may be text-based (such as a typed message from a viewer), speech-based (such as audio captured by a microphone), or image-based (such as a selected image or a captured image of a user). This reception can be performed by a local device to the viewer, or by a server for remote processing.

At a step 210, the received inputs are prepared for further processing. Such a step may be unnecessary for text-based inputs, as these may be in a suitable format. In the case of speech-based inputs, a transcription of the audio may be generated as an example of processing. With image-based inputs, some form of image interpretation may be performed (such as generating a representative word or phrase), or gesture recognition or the like may be performed to identify a meaning or input associated with the image.

At a step 220, the value of n for the generation of n-grams from the inputs is determined. In some embodiments, such a step may be omitted in favour of a pre-defined value of n for a particular application. A tri-gram is often considered useful for many purposes, which is an example of selecting the value of n as three. In some cases, multiple values of n may be selected such that multiple representations of the inputs are generated for analysis.

At a step 230, the n-grams are extracted from the inputs in accordance with the value (or values) of n selected in step 220. These may be stored separately to the input, or replace the received input altogether. In some embodiments, the generated n-grams may also be stored so as to enable them to be used for future n-gram analysis (such as for refining input predictions).

In embodiments of the present disclosure, once n-grams of an appropriate size are generated from the received inputs they are analysed so as to assign one or more properties to one or more of the n-grams or the associated inputs (or a representation of those inputs). These properties may be determined on a per-input basis, a per-viewer basis, a per-game (or other group) basis, on the basis of all inputs received, or any other suitable group or instance of n-grams.

A first property that may be considered useful when analysing the n-grams is that of determining the frequency of one or more of the n-grams. Similarly, the change in frequency over time (equivalent to a measurement of the acceleration of the use of a term) may also be determined and the rate of this change (equivalent to a measurement of the jerk of the use of a term) may be considered useful in some cases. An example of detecting the frequency is that of counting the instances of a particular n-gram amongst the generated n-grams for an input (or a selection of inputs).

The analysis may also (or instead) comprise a determination of the sentiment of n-grams (or a set of n-grams, or any other portion of an input). For instance, a text input (or a portion of a text input) could be characterised based upon a mood (such as 'happy' or 'sad') or more generally based upon the character of the message (such as 'positive', 'negative', or 'supportive'). This may be based upon any suitable parameters; examples include keywords (or groups of words), input length (for example, measured as the number of n-grams in an input).

In some embodiments, it may be considered suitable to perform an analysis to identify one or more game- or application-specific terms within the n-grams. This may be useful in determining a relevance of the inputs, for instance, or for filtering the generated n-grams. In the former case this can be useful for removing irrelevant inputs (such as discussing the weather instead of a game), while in the latter case this can be useful for preventing sensitive information (such as a map position of a player) from being considered. Relevant terms may be pre-identified (for example, by a game developer), or may be determined based upon information about the game or training of a system to identify relevant terms. For example, relevant terms may be identified based upon usage frequency relative to other games (or general use), in dependence upon game category, or in dependence upon information about a game. The use of these techniques may be advantageous in that they may be used to simplify the inputs before performing any natural language processing or the like; this may enable a streamlining of this processing or the use of a simpler process, thereby increasing system performance.

In some cases, it may be considered beneficial to identify event-related terms within the generated n-grams. This can be useful in enabling the identification of active areas within the game, which can enable viewers or commentators to redirect their field of view to an area which may be considered to be more important or eventful. This can assist both from an entertainment point of view, by highlighting the action, and a technical point of view, as it can reduce the need for rapid changes in camera placement and the like in response to events.

Of course, any other suitable analysis or characterisation of the n-grams may be performed as appropriate for a given embodiment so as to enable an improved utilisation of the inputs.

Once the n-grams have been suitably analysed and/or characterised, processing is performed to generate an output based upon the inputs provided by the viewers. In embodiments of the present disclosure, a representation of these inputs is provided either as a part of the virtual environment being viewed, or in association with a view of that environment.

Figure 3:
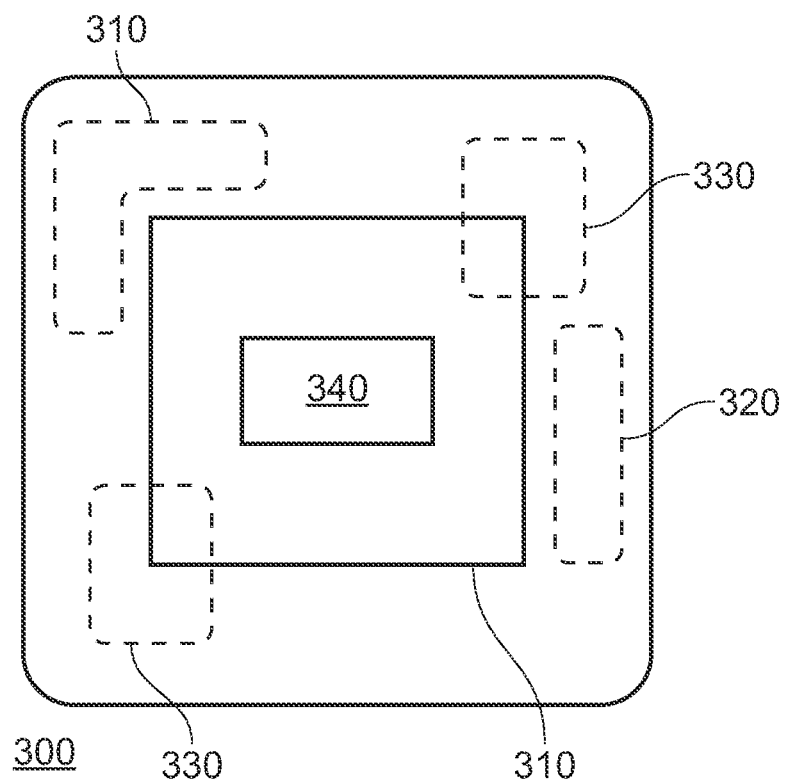
FIG. 3 schematically illustrates an overlaid display.

FIG. 3 schematically illustrates an example of an arrangement in which representations are displayed in associated with a view of the virtual environment, such as a game environment. As discussed above, this may include the use of one or more representative words, phrases, and/or images to convey an aspect of the received inputs.

In this Figure, the display area 300 comprises the content display area 310 in addition to exemplary representation display areas 320, 330, and 340. The representation display areas 320 are examples of locations for the placement of representation of inputs that surround the content display area 310 so as to provide a border effect. Similarly, representation display areas 330 are arranged so as to largely occupy the area surrounding the content display area 310 albeit with some overlap of the content display area 310. Finally, the exemplary representation display area 340 shows a display in which the area is entirely contained within the content display area 310.

The use of each of the areas can be determined freely, based on any suitable factors. For example, the importance or relevance of a representation may be used in the determination; the more important or relevant an n-gram, the closer to the centre of the display area 300 it is displayed. This may be determined on a per-viewer basis and/or a per-content basis—for instance, comments relating to a player's favourite team may be shown with a greater priority (and therefore closer to the centre).

Other features of the display of the input representations may also be varied, rather than just the display position. For example, colours and font sizes may be modified to make words appear more or less imposing or eye-catching. Similarly, one or more animations or effects may also be provided to attract attention for example.

Figure 4:
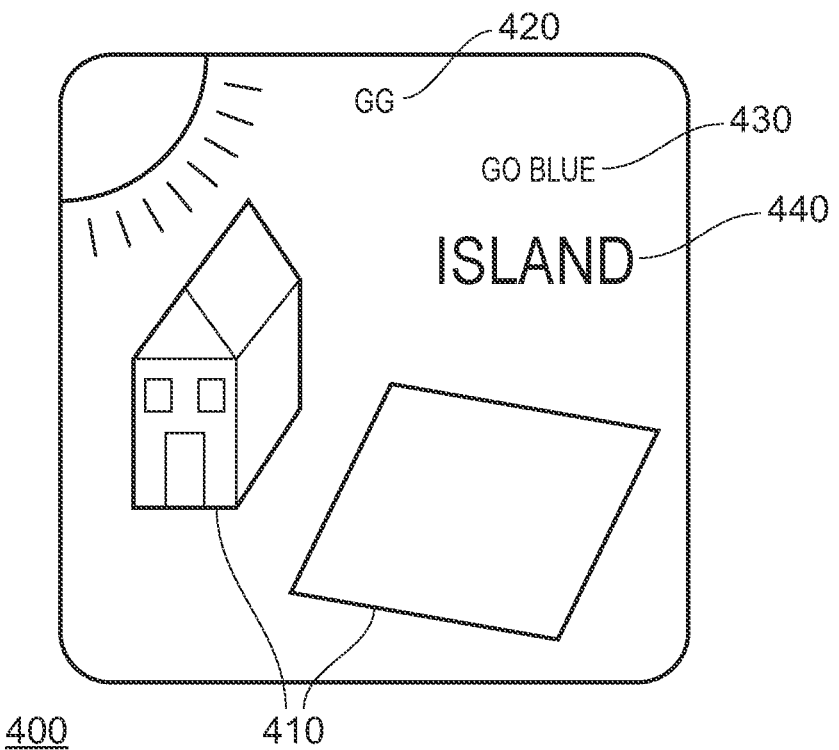
FIG. 4 schematically illustrates an integrated display.

FIG. 4 illustrates an example of the display of such content in a manner that is integrated with the virtual environment. The display 400 comprises virtual environment elements 410 (a building and a park), and a plurality of representative words and phrases 420, 430, and 440. By integrating the elements 420, 430, and 440 into the virtual environment, the viewer is able to be presented with the additional content without an undue burden upon the on-screen real estate. That is, the viewer is not required to have a separate chat window which shares the screen (thereby reducing the display size of the video content) and is not presented with an overlaying window that obscures the content. Such considerations may be particularly important in the context of immersive display technology, such as head-mountable displays.

The arrangement of the elements 420, 430, and 440 is referred to collectively as a word cloud; and the format in which they are shown is a rather literal use of this term in showing the words together in the sky. However, this is not intended to be limiting and it is instead considered that a variety of different display methods may be employed. For example, the location of the words and their distribution may be modified freely as appropriate for an environment—the words may be scattered to any suitable degree, and be presented in any number of locations (and possibly multiple times). For example, rather than being displayed in the sky words may be presented alongside or in conjunction with one or more virtual elements (such as a billboard-style presentation on the side of a virtual building), with each building showing a different word.

Here, the word 'element' is used to refer to a visual representation of one or more n-grams that are generated from the inputs described above. It is therefore considered from an element may comprise any number of words (although one to three words may be considered a suitable range of lengths, as the conciseness may aid clarity) and/or images representing at least a portion of an input.

In some embodiments it is considered that the elements 420, 430, and 440 are added to the viewer's own viewing experience, while in others it may be more appropriate to insert the elements into the content itself. For example, the elements may be provided within an in-game environment so as to be viewable by the players themselves or they may be added to game footage specifically for spectator views only. This generation of a spectator view comprising the elements may be tailored to one or more individuals or groups of viewers; examples of groups include those based on nationality, language use, team affiliation, age, skill level within a relevant game, viewing device, and/or one or more profile settings.

In the particular example of FIG. 4, the element 420 'GG' (a shortened representation of 'good game') is an example of a gaming-specific term that is frequently used at the end of a game effectively as a virtual handshake to show good sportsmanship. It can also be used after a significant in-game event which leaves a team at a significant advantage; this is an acknowledgement that the game is as good as won, and that continuing is likely to be a formality. This is therefore an example of an n-gram that could be generated and identified as being indicative of a game state, and therefore of relevance to viewers of both teams.

The element 430 'GO BLUE' is an example of a team-specific message of support. This therefore represents a rather generic statement, as it is not necessarily linked to that specific virtual environment or the specific players of a game or the like, but may be considered relevant due to high usage and therefore suitable for display in this manner.

The element 440 'ISLAND' is an example of game-specific information that may be extremely relevant to events within the virtual environment. Such an element may be an indication of an event occurring at the location mentioned, such as a combat between two teams. This content may therefore be displayed with a high priority due to it being specific to the environment and time-specific. However, in some embodiments such information may be considered to be too sensitive for display—for instance, during a competitive game such information may give away a surprise attack by the other team ahead of time. It is therefore apparent that in some embodiments this element is an example of a term that may be filtered.

Of course, the filtering of a term doesn't mean that it cannot be used; terms that relate to the specifics of gameplay (such as events or locations) can be provided to a commentator of the game or the like to guide the commentary process for users. These terms could also be used as an input for an automated camera view generation scheme for a spectator view.

The elements 420, 430, and 440 may be displayed for any suitable length of time, and with any suitable display parameters. For instance, element 430 could be coloured blue so as to show the team affiliation of the message. The manner in which the elements are displayed can be selected so as to convey one or more aspects of those elements. The display may be managed on a per-element basis and/or on a group basis. That is, rather than modifying only the appearance of a single element it is considered that it may be advantageous to instead (or additionally) manage the appearance of a cohort or group of elements to convey one or more aspects of the elements. The parameters associated with an element may be defined upon creation, and/or updated throughout the lifetime of the element.

A first example of a parameter that may be modified or selected is that of the size of the element. For example, the font size used to represent an element may be directly proportional to the frequency of use of the term in the received inputs—the more common a term, the larger the font. The size of the element may also be scaled in accordance with any other parameter—examples include the frequency change (so as to reflect a sudden increase in frequency), the relevance of the content of the element to the virtual environment (such that environment-specific terms are shown larger than generic terms), and the content of the element itself (such as keywords in the environment having a larger font size, an example being 'goal' in a football game). Similarly, the font style and the text colour may be selected to emphasise some elements more than others.

Another parameter that may be adjusted (as noted above) is that of the display period. Elements may be assigned a default display period, or the display period may be determined on an element-specific basis (such that particular terms have a longer display time than others). Alternatively, or in addition, the display period may be determined on the basis of the use of the term.

In some examples, a keyframing process may be utilised so as to correlate the relevance of words and in-content events. That is to say that a specific event within the content (such as an explosion) may be identified, and words that are related to that event are highlighted as being particularly relevant during the display of frames that represent that event. Such a process may be used to vary the 'focusing' of the displayed elements; an example of this having the display of an element being more closely linked to an event where appropriate. For instance, those terms relating to the explosion may vanish more quickly after the explosion than more general terms.

For instance, the display period may be defined as the period of time for which the frequency of use of an n-gram in inputs equals or exceeds a threshold. Similarly, one or more other characteristics of the use of the n-gram associated with an element may be considered. For instance, the threshold may be defined as a percentage of the peak usage of the n-gram, and/or the elapsed time since peak usage of the n-gram may be considered. Alternatively, or as an additional factor, a statistical analysis of the use may be performed such that the standard deviation or the like is used to calculate the display period.

While examples of element-specific display parameters have been discussed above, it is also considered that the grouping or arrangement of a plurality of elements may also be used to convey information.

For example, elements may be arranged in a multi-layer format such that each layer is associated with a particular parameter or characteristic of the displayed element. An example of such a parameter is the frequency of use of an n-gram associated with the element; a higher layer (perhaps combined with other visual effects) could signify the highest frequency of use, in some examples (although of course, the arrangement of elements in this manner can be determined freely). Similarly, layers may correspond to the relevance of an element to the virtual environment, or the duration of time for which the element has been displayed. Any one or more suitable characteristics or parameters may be considered when determining the arrangement of the elements as appropriate for a particular implementation.

While the use of a vertical structuring such as the multi-layer format above may be advantageous, it is also considered that a planar arrangement could be used instead (or in addition) so as to convey information. For instance, terms could be located in the horizontal plane based upon a characterisation—to provide a specific example, team support message elements could correspond to a first and second quadrant (one for each team) with reaction elements assigned to a third quadrant and general chat elements to a final quadrant.

An alternative, or additional, implementation to the above segmentation of the element display area is that of an element clustering display scheme. In such a scheme, elements that have a relatively high degree of relevance to one another (such as elements with a similar meaning, or a similar sentiment) may be presented closer together. This can result in the generation of clusters of elements, which can aid in identifying trends in the inputs. The varying of the clustering over time (as the elements change due to varying usage) can also provide further information—for example, the relative size of respective clusters of positive and negative elements relating to a team's performance can be indicative of the perceived performance of the team. In some cases, a representative term for the cluster may be selected or generated so as to clearly identify what it represents.

The above examples of display parameters each relate to static elements, however it is considered that it may be advantageous to have dynamic display properties as well. For instance, elements may have an associated motion during the display period.

A first example is that of varying the velocity of elements within the multi-tier structure described above. As elements become more or less popular, they may move between tiers and this may be reflected by a motion of the element. In some cases, this may result in motion being applied when the element leaves the structure too; for instance, as an element becomes less frequently used it may have a downwards velocity so as to move to lower tiers. Upon reaching the bottom tier, if the usage continues to fall the velocity may lead to the element leaving the tiered arrangement altogether so as to 'rain down' upon the virtual environment below. Similarly, elements that have remained popular but have been displayed for a long time may be seen to rise upwards above the tiered arrangement so as to appear to float away. Of course, the velocity and associated visual effects may be determined freely in such embodiments—this discussion is merely exemplary.

When introducing a more dynamic display, it is considered that there may be an increased interaction between elements may be desirable. For instance, collisions between elements may be simulated; these collisions may take any suitable form. In some embodiments, the collisions may simply result in a deflection or redirection of elements as appropriate based upon the velocity (and/or other parameters, such as an assigned 'weight'). In other cases, the collisions may instead result in a combining of elements. Such a combination may result in the changing of the element in any suitable respect; for instance, the size of the element may change, a new element representative of one or both of the component elements (such as a portmanteau or catch-all term) may be generated in place of the initial elements, or the elements may be removed with no replacement (this may be appropriate if contrasting elements collide, such as 'go red' and 'go blue').

When generating such a display, numerous additional factors may be considered when determining an appropriate method for conveying the information relating to the inputs.

A first example is that of applying a priority value or the like which is indicative of the importance of an element. This may be determined in any suitable manner; in some embodiments, it is considered that the relevance of the n-gram from which the element is generated to the virtual scene or environment may be determined and used to modify a priority value. That is to say that an element which is deemed to have a higher relevance (such as by referring to specific features or events within a displayed environment) may be assigned a higher priority value.

Similarly, in some embodiments an element may have a priority value that is instead (or also) modified in dependence upon the manner in which the inputs are provided and/or the users that provide the inputs. That is, voice inputs may have a higher priority than text inputs (or any other variation of priorities) so as to emphasise elements provided using a preferred input method. Users may also each have a priority associated with their inputs that can influence the display of related elements; for example, the inputs of more influential users (such as those with a large fan base) may be determined to have a higher priority. Similarly, analysts associated with the content being viewed (such as a commentator on a game) may also have a larger priority value associated with their inputs.

This priority value may be reflected in the display of the element in any suitable manner. For instance, a higher-priority element may be displayed with a larger size than an element with a lower priority despite only small differences in other characteristics of the element (such as usage frequency).

A further factor that may be considered is that of the suitability of an element for display. In some cases, the received inputs may contain unsavoury comments or otherwise inappropriate comments that should not be displayed. Examples of this are described above with reference to the filtering of sensitive information. Such a filtering process may be applied to the n-grams directly, or to generated elements prior to display (for instance).

Alternatively, or in addition, processing may be performed to generate representative elements rather than (or in addition to) elements that are directly derived from n-grams. This may comprise an interpretation of the received inputs in a suitable manner, such as identifying a meaning of an n-gram or a set of n-grams, or identifying key words or phrases amongst the n-grams. This can enable a more accurate representation of the received inputs in some cases.

For example, in an arrangement in which the size of an element is proportional to its frequency of use, a misrepresentation can occur when numerous alternative phrases are used to convey the same (or a similar) message. An example of such a scenario is when one hundred users each provide an input of "go red"; a corresponding element here would be much larger than each of those generated by one hundred other users who provide an input such as "go blue", "come on blue", "try hard, blue", or "you can score, blue". That is to say that if the first group of users each use the same phrase, this results in an element that is much larger than the four elements related to the second group that have only a quarter of the use.

It may therefore be appropriate to interpret the n-grams or elements and generate a representative element. To use the above example, the second group of phrases could each be identified as a variation of "go blue" and a single element could be generated that is considered to have the combined frequency of each of the phrases in the group. This would result in an element with a much more comparable size to that of the "go red", and therefore would be a more accurate representation of the inputs provided by those users.

While the above description has been provided in the context of the example of FIG. 4, analogous display decisions can be made so as to generate a corresponding effect in the context of the arrangement of FIG. 3. Discussion of the specifics of such display has been omitted for the sake of conciseness, as it would be anticipated that the person skilled in the art would be able to adapt the above teachings as desired. For instance, the skilled person would consider the modification of the word cloud so as to appear above the display area of FIG. 3 (in a two- or three-dimensional fashion as appropriate) to be a modification that could be implemented.

In some embodiments, as noted above, it is considered that it may be advantageous to tailor the generated word cloud content to each viewer (or to one or more groups of viewers). Such personalisation may enable more relevant information to be generated and displayed for each individual/group. This can result in an improved viewing experience, both by increasing the relevance of the generated content to the viewer's interests (or the like) and by reducing the amount of content to be displayed to the users by improving the targeting of the content. This can reduce the amount of information that is to be displayed, thereby reducing the visual impact of the generated elements whilst maintaining a comparable level of relevant information.

Such a feature may be implemented in a number of suitable manners. For instance, a number of representative user profiles may be stored at a server and a corresponding stream or set of elements may be generated for each. Each user may then request a stream or elements (or be served with them) based upon which of the representative profiles most corresponds to their own user profile. Alternatively, or in addition, a process may be implemented in which a stream of data representing at least a portion of the n-grams is generated and transmitted to each spectating device. This data stream may then be examined locally in order for a personalised element display to be generated locally for the user associated with that device.

Such personalisation may be implemented in a number of suitable ways. For example, the selection of elements may be performed according to one or more personalisation criteria, or the display may be modified according to personalisation criteria. For instance, in some embodiments a user may be able to specify one or more categories of element to be displayed in preference (such as with a higher priority, or with an increased size or the like) or to be not displayed at all (effectively acting as a personal filter). This may enable the preferential display of information that is considered more relevant to the user—thereby reducing congestion on the screen and reducing the risk of obscuring elements of interest. For example, a user that is more interested in the details of the game than supporting a team may be able to suppress elements relating to team support and prioritise elements relating to in-game events or locations and the like.

In some embodiments, the content being viewed is live (or at least substantially live, such as delayed by a few seconds or minutes) and as such the elements must be generated and provided in real-time. However, in embodiments in which the content is pre-recorded and streamed or viewed on demand, it may be possible to update the elements and/or their display over a longer period of time. For instance, the elements may be updated at regular intervals (such as each hour, or each day) or after a predetermined number of views, so as to include the inputs of those additional viewers.

While the above description has related to the elements being provided in a passive manner, in which the display of the elements is predetermined, in some embodiments it is considered that the addition of interactivity between users and the elements may be advantageous. This may be both due to increased viewer engagement, and the potential for the increased relevance of the elements being displayed.

For instance, once elements are displayed it may be possible for users to provide additional input (for example, in the form of keystrokes or gamepad inputs) that are able to influence the elements in a specified manner. A first example of this is allowing users to vote on which elements are of particular relevance (or the opposite), which can be used as feedback to modify (or even prevent) the display of those elements. Such inputs can also be used to influence future element display, for example by modifying future priority values for elements. These updates may be generated on a personal (per-viewer) basis, or for the display of all elements using the described methods (or at least the display relative to the same content or group of content, such as updating the priority values in the context of a specific game).

Alternatively, or in addition, it may be considered that users are able to control elements or to interact with them in a more direct manner. For example, players may be able to provide inputs that control the motion of an element or the user may have a personal user-controlled object (such as a virtual aircraft) that can be controlled to navigate about the elements that are displayed. The user-controlled object may be able to influence the motion or other characteristics of the elements (such as hit points, or shape) via one or more interactions such as attacks or collisions. Such interactivity may be provided in a multi-user environment, or on a personal per-viewer basis, as appropriate. In the former case, it is considered that multiple user-controlled objects are provided or that inputs provided to elements are aggregated or the like to determine the overall effect that is generated.

User inputs relating to the elements may also be used to determine which of the elements (if any) are displayed to one or more players in a game that is being viewed, for example. This can therefore allow viewers to interact with the content without direct involvement. This may be the result of interactions such as those described above (for instance, players only see elements with an above-threshold duration, or interactions are used to identify which elements are to be displayed).

The displayed elements, and any interactions between viewers and those elements, may be further used to guide the viewing experience of one or more viewers. For instance, in some embodiments the content to be displayed may be selected in accordance with the elements or interactions with the elements. An example of this is if it is observed that viewers have a high affinity with a particular team (such as the element being displayed with an above-threshold size, or the element not being attacked by many users in an interactive embodiment) then it may be determined that it would be desirable to display content relating to that team next. Similarly, any suitable links between displayed elements (and/or interactions with them) and additional content may be derived and utilised.

Figure 5:
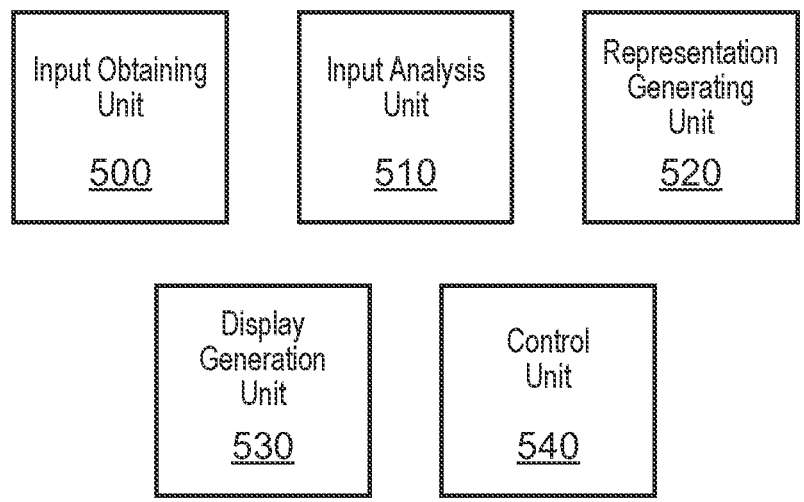
FIG. 5 schematically illustrates a content generation system.

FIG. 5 schematically illustrates a content generation system, the system comprising an input obtaining unit 500, an input analysis unit 510, a representation generating unit 520, a display generation unit 530, and a control unit 540. While shown together, it should be understood that the functions performed by each of these named units may be distributed in any suitable manner rather than being present in the same device; for example, a processing device (such as a games console) may be used to implement the claimed features in conjunction with a server.

The input obtaining unit 500 is operable to obtain one or more samples of input text and/or audio relating to a first content. In some embodiments, the first content is a video game and the one or more samples are obtained from one or more players and/or spectators of the video game. Alternatively, the first content may be any other video (such as a sports match, movie, or television programme).

The input analysis unit 510 is operable to generate n-grams representing one or more elements of the obtained inputs. As discussed above, n may take any suitable integer value—although values of two or three may be particularly appropriate. In some embodiments, the input analysis unit 510 is operable to generate multiple n-grams for the same sample, each with a different value of n. This may enable the generation of a more detailed representation of the inputs.

In a number of embodiments, the input analysis unit 510 is operable to identify one or more parameters of the generated n-grams, wherein the one or more parameters include a frequency of use, relevance to the first content, and/or a change in the frequency of use. Any of the parameters relating to the categorisation or characterisation of the n-grams as described above may be considered suitable in this context.

The representation generating unit 520 is operable to generate a visual representation of one or more of the generated n-grams. In some embodiments, the visual representation comprises one or more three-dimensional elements that each correspond to one or more of the generated n-grams; however, it is also considered that two-dimensional elements may be provided instead (or in addition). The representation generating unit 520 may be operable to use one or more parameters identified by the input analysis unit 510 to determine one or more properties of at least a portion of a visual representation; this is exemplified in the above description by the modification of a display size of an element in dependence upon the frequency of use of the associated n-gram.

As discussed above, the elements of the visual representation may be configured to interact with one another so as to modify one or more properties associated with that element. Examples of this include collisions between elements that result in a change in velocity of one or both elements, the combining of elements, and/or a change in size of the elements. These examples should not be considered limiting, as any suitable parameters may be considered appropriate for modification in this manner.

The display generation unit 530 is operable to generate second content comprising one or more elements of the visual representation in association with the first content. In some embodiments, the display generation unit 530 is operable to generate second content to be overlaid upon the first content, and/or displayed adjacent to the first content. Alternatively, or in addition, the display generation unit 530 is operable to generate the second content to be displayed within the first content. The display generation unit 530 may be operable to generate second content on a per-user basis, such that users are each provided with a unique (or at least personalised) second content.

In some embodiments, the display generation unit 530 is operable to arrange one or more elements of the visual representation in dependence upon one or more properties associated with those elements. An example of this in the above description is that of layering the elements based upon frequency of use or relevance; however, it would be understood by the skilled person that any method in which the location of an element is determined based upon any one or more properties described above may be appropriate. Examples of properties of the elements of the visual representation may include one or more of a relevance to the first content, a display size, one or more other display parameters, one or more motion parameters, and/or one or more pieces of context information.

The (optional) control unit 540 is operable to receive one or more control signals from a user so as to modify one or more parameters of an element of the visual representation and/or otherwise interact with the element. These control signals may be provided using any suitable input device; non-limiting examples include gamepads, keyboards, and motion-based inputs.

The arrangement of FIG. 5 is an example of a processor (for example, a GPU and/or CPU located in a games console and/or any other computing device) that is operable to generate content for display, and in particular is operable to:
  obtain one or more samples of input text and/or audio relating to a first content;
  generate an n-gram representing one or more elements of the obtained inputs;
  generate a visual representation of one or more elements of the generated n-gram; and
  generate second content comprising one or more elements of the visual representation in association with the first content.

Of course, as noted above it should be considered that the processors used to implement these functions may be distributed across multiple devices (such as local and remote processing devices) as appropriate.

Figure 6:
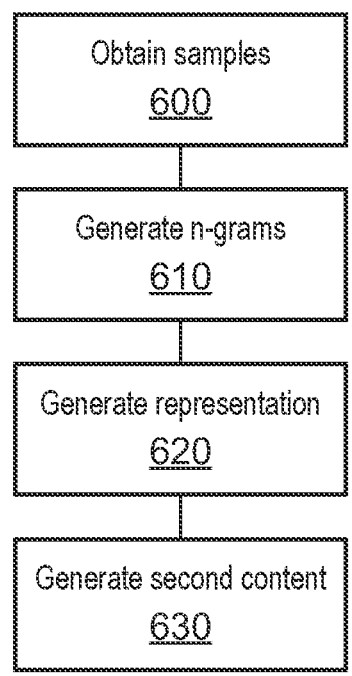
FIG. 6 schematically illustrates a content generation method.

FIG. 6 schematically illustrates a content generation method. In some embodiments, an option user control step is provided (in accordance with the above description) as an example of additional processing that may be performed; however this is not shown in the example of FIG. 6 for the sake of conciseness.

A step 600 comprises obtaining one or more samples of input text and/or audio relating to a first content.

A step 610 comprises generating n-grams representing one or more elements of the obtained inputs.

A step 620 comprises generating a visual representation of one or more of the generated n-grams.

A step 630 comprises generating second content comprising one or more elements of the visual representation in association with the first content.

It may be appropriate in some embodiments to utilise a machine learning model or the like to perform one or more steps of the above method (or any other processing identified in the above description). This may be advantageous in that patterns in the provided inputs and generated n-grams may be identified efficiently; this may be useful for improving the display generation, for instance by more accurately identifying the relevance of terms to content and the like.

As noted above, the process that has been described may be configured to be performed using a plurality of different processing devices and/or display devices as appropriate. In some embodiments, n-grams are generated at the client and only the results of this are transmitted to the server; this enables a reduction in network bandwidth to be observed relative to an embodiment in which all of the chat is transmitted. Similarly, when only the n-grams or representations (from one or more other users) are transmitted from a server to a client then these same benefits may be observed. In the latter case, the inputs from potentially hundreds or thousands of other users may be effectively condensed into one or more representative words and/or phrases (that is, the n-grams) which would be associated with a significant bandwidth reduction.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented according to one or more of the following numbered clauses:

1. A content generation system, the system comprising:
  an input obtaining unit operable to obtain one or more samples of input text and/or audio relating to a first content;
  an input analysis unit operable to generate n-grams representing one or more elements of the obtained inputs;
  a representation generating unit operable to generate a visual representation of one or more of the generated n-grams; and
  a display generation unit operable to generate second content comprising one or more elements of the visual representation in association with the first content.

2. A system according to clause 1, wherein:
  the first content relates to a video game, and
  the one or more samples are obtained from one or more players and/or spectators of the video game.

3. A system according to any preceding clause, wherein the display generation unit is operable to generate second content to be overlaid upon the first content, and/or displayed adjacent to the first content.

4. A system according to any preceding clause, wherein the display generation unit is operable to generate the second content to be displayed within the first content.

5. A system according to any preceding clause, wherein the visual representation comprises one or more three-dimensional elements that each correspond to one or more of the generated n-grams.

6. A system according to any preceding clause, wherein the input analysis unit is operable to generate multiple n-grams for the same sample, each with a different value of n.

7. A system according to any preceding clause, wherein the elements of the visual representation are configured to interact with one another so as to modify one or more properties associated with that element.

8. A system according to any preceding clause, comprising a control unit operable to receive one or more control signals from a user so as to modify one or more parameters of an element of the visual representation and/or otherwise interact with the element.

9. A system according to any preceding clause, wherein:
the input analysis unit is operable to identify one or more parameters of the generated n-grams, wherein the one or more parameters include a frequency of use, relevance to the first content, and/or a change in the frequency of use, and
the representation generating unit is operable to use one or more parameters identified by the input analysis unit to determine one or more properties of at least a portion of a visual representation.

10. A system according to any preceding clause, wherein the display generation unit is operable to generate second content on a per-user basis.

11. A system according to any preceding clause, wherein the display generation unit is operable to arrange one or more elements of the visual representation in dependence upon one or more properties associated with those elements.

12. A system according to any preceding clause, wherein properties of the elements of the visual representation include one or more of a relevance to the first content, a display size, one or more other display parameters, one or more motion parameters, and/or one or more pieces of context information.

13. A content generation method, the method comprising:
obtaining one or more samples of input text and/or audio relating to a first content;
generating n-grams representing one or more elements of the obtained inputs;
generating a visual representation of one or more of the generated n-grams; and
generating second content comprising one or more elements of the visual representation in association with the first content.

14. Computer software which, when executed by a computer, causes the computer to carry out the method of clause 13.

15. A non-transitory machine-readable storage medium which stores computer software according to clause 14.

The invention claimed is:

1. A content generation system, the system comprising:
an input obtaining unit operable to obtain one or more samples of input text and/or audio relating to a first content;
an input analysis unit operable to generate n-grams representing one or more elements of the obtained inputs;
a representation generating unit operable to generate a visual representation of one or more of the generated n-grams, the visual representation comprising one or more two-dimensional objects and/or three-dimensional objects; and
a display generation unit operable to generate second content comprising one or more of the two-dimensional objects and/or the three-dimensional objects of the visual representation in association with the first content, wherein:
the first content relates to a video game,
the one or more samples are obtained from one or more players and/or spectators of the video game, and
the two-dimensional objects and/or the three-dimensional objects of the visual representation are configured to interact with one another so as to modify one or more properties associated with such objects, wherein an interaction between the objects comprises a collision of the objects.

2. The system of claim 1, wherein the display generation unit is operable to generate second content to be overlaid upon the first content, and/or displayed adjacent to the first content.

3. The system of claim 1, wherein the display generation unit is operable to generate the second content to be displayed within the first content.

4. The system of claim 1, wherein the input analysis unit is operable to generate multiple n-grams for the same sample, each with a different value of n.

5. The system of claim 1, comprising a control unit operable to receive one or more control signals from a user so as to modify one or more parameters of one or more of the two-dimensional objects and/or the three-dimensional objects of the visual representation and/or otherwise interact with the element.

6. The system of claim 1, wherein:
the input analysis unit is operable to identify one or more parameters of the generated n-grams, wherein the one or more parameters include a frequency of use, relevance to the first content, and/or a change in the frequency of use, and
the representation generating unit is operable to use one or more parameters identified by the input analysis unit to determine one or more properties of at least a portion of a visual representation.

7. The system of claim 1, wherein the display generation unit is operable to generate second content on a per-user basis.

8. The system of claim 1, wherein the display generation unit is operable to arrange one or more of the two-dimensional objects and/or the three-dimensional objects of the visual representation in dependence upon one or more properties associated with such objects.

9. The system of claim 1, wherein properties of the two-dimensional objects and/or the three-dimensional objects of the visual representation include one or more of a relevance to the first content, a display size, one or more other display parameters, one or more motion parameters, and/or one or more pieces of context information.

10. A content generation method, the method comprising:
obtaining one or more samples of input text and/or audio relating to a first content;
generating n-grams representing one or more elements of the obtained inputs;
generating a visual representation of one or more of the generated n-grams, the visual representation comprising one or more two-dimensional objects and/or three-dimensional objects; and
generating second content comprising one or more of the two-dimensional objects and/or the three-dimensional objects of the visual representation in association with the first content, wherein:
the first content relates to a video game,
the one or more samples are obtained from one or more players and/or spectators of the video game, and
the two-dimensional objects and/or the three-dimensional objects of the visual representation are configured to interact with one another so as to modify one or more properties associated with such objects, wherein an interaction between the objects comprises a collision of the objects.

11. A non-transitory machine-readable storage medium which stores computer software which, when executed by a computer, causes the computer to perform a content generation method comprising the steps of:

obtaining one or more samples of input text and/or audio relating to a first content;
generating n-grams representing one or more elements of the obtained inputs;
generating a visual representation of one or more of the generated n-grams, the visual representation comprising one or more two-dimensional objects and/or three-dimensional objects; and
generating second content comprising one or more of the two-dimensional objects and/or the three-dimensional objects of the visual representation in association with the first content, wherein:
the first content relates to a video game,
the one or more samples are obtained from one or more players and/or spectators of the video game, and
the two-dimensional objects and/or the three-dimensional objects of the visual representation are configured to interact with one another so as to modify one or more properties associated with such objects, wherein an interaction between the objects comprises a collision of the objects.

\* \* \* \* \*